Patented May 2, 1939

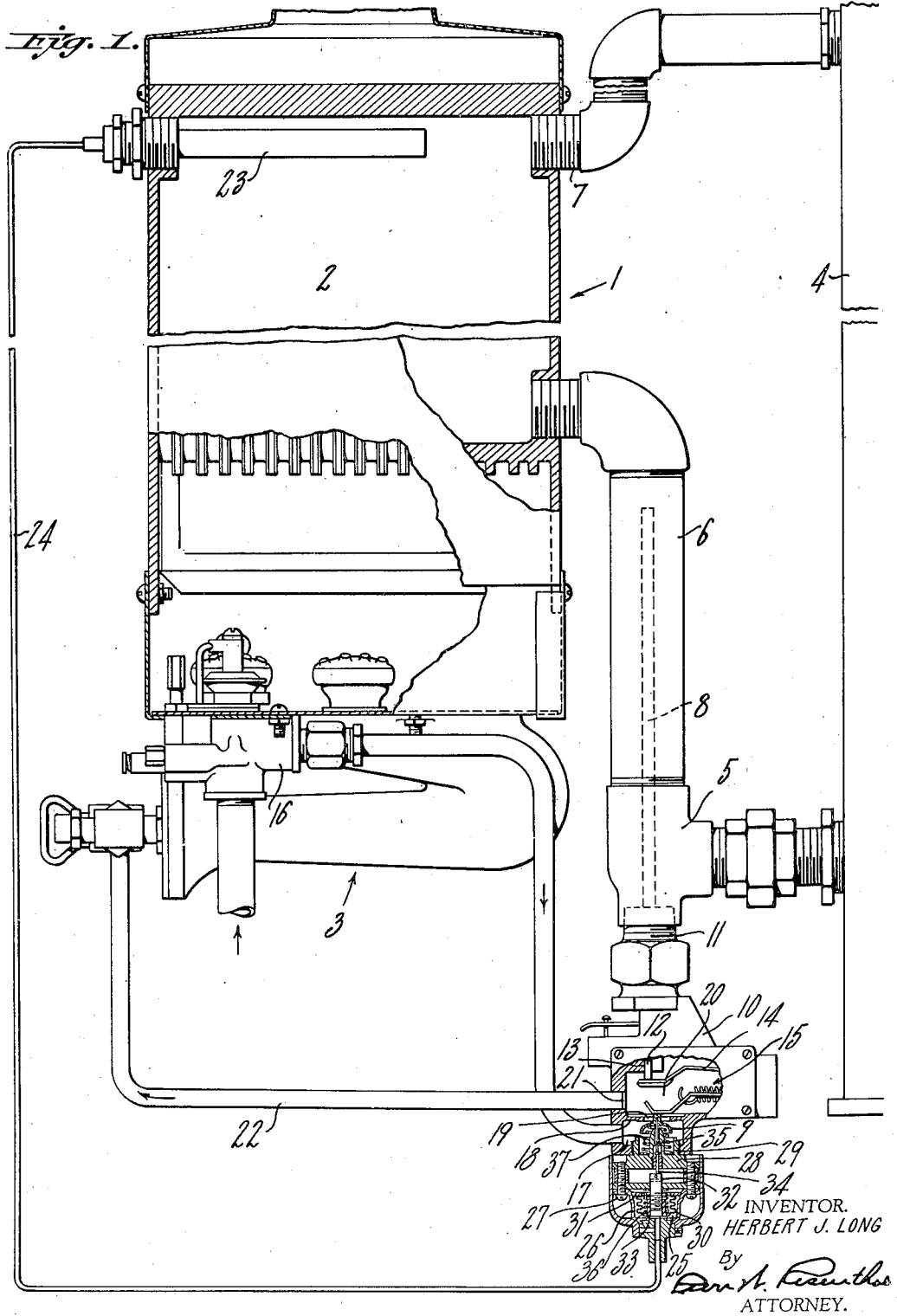

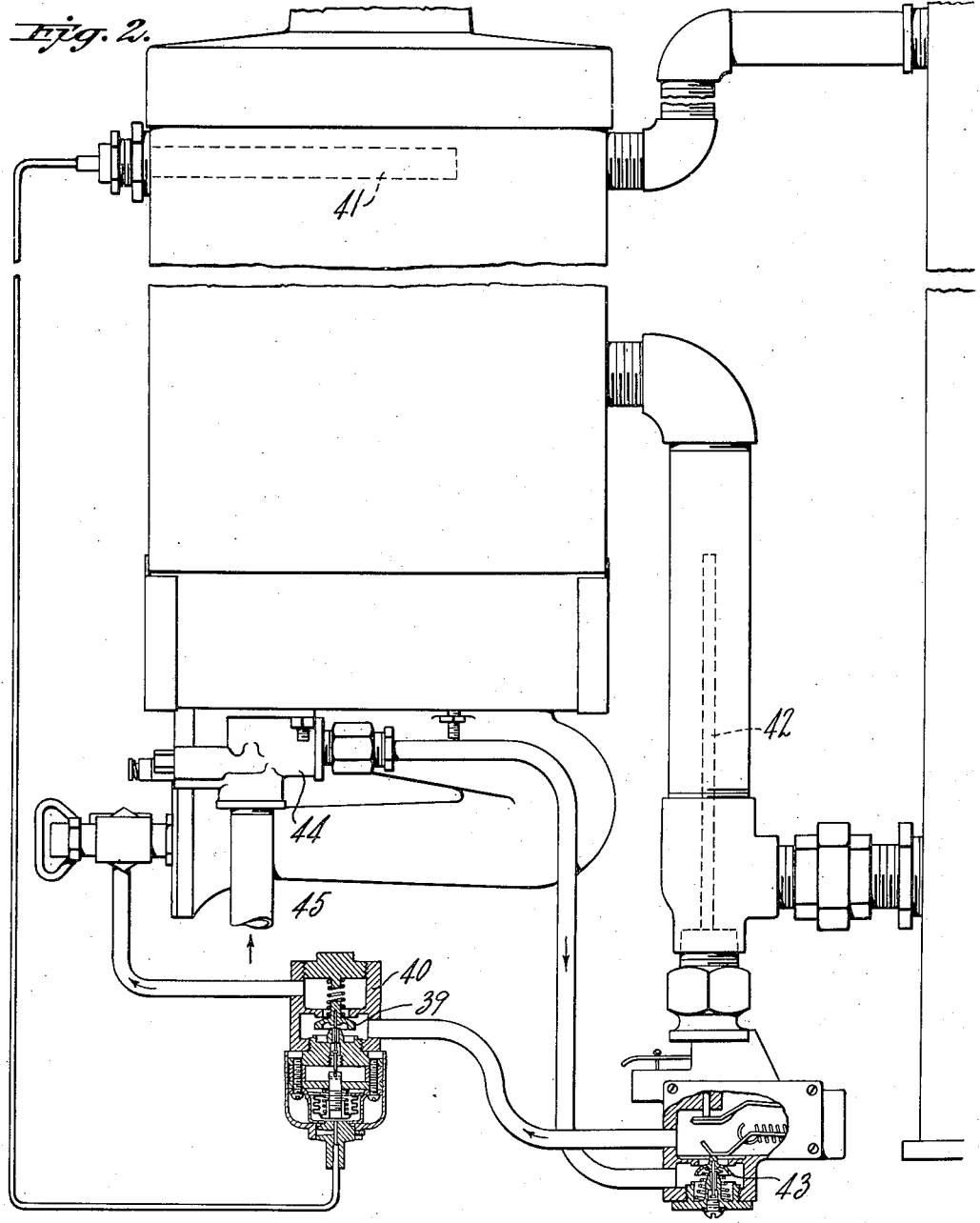

2,156,458

UNITED STATES PATENT OFFICE 2,156,458

TEMPERATURE CONTROL FOR WATER HEATERS

Herbert J. Long, Springfield, Mass., assignor to American Bosch Corporation, a corporation of New York Application July 17, 1937, Serial No. 154,125

6 Claims. (Cl. 236—20)

This invention relates to temperature controls for water heaters, particularly the water storage type.

In high recovery gas units, it is customary to use a snap action thermostat to control the main burner. The snap-acting thermostat is usually placed in the hot water outlet from the heating unit or in the upper portion of the storage tank. Such an arrangement is unsatisfactory due to the fact that it renders the burner intermittent in operation for a considerable time during the final heating period. This intermittent operation may continue for as long as a half hour operating in periods from 2 to 3 minutes each. It has been sought to avoid this unsatisfactory operation by installing the thermostat either in the bottom of the cold water circulator or in the lower portion of the tank itself. In either case the thermostat is set in a strata of water which is colder than the water at the top of the tank, so that the thermostat in this location has no real control of the temperature of the water leaving the heater.

A further defect inherent in water heaters as heretofore constructed resides in the fact that upon the initial starting of the heater at a time when there is no circulation through the heating element, the temperature within the heating element may become excessively high due to the inertia of the column of liquid which must be set in motion before normal circulation through the heating element can occur. Such overheating is sometimes very material and becomes a considerable factor in the life of the heating element.

A further defect which is inherent in gas fired water heaters as at present constructed resides in the fact that a small draw of water will snap on the gas at full capacity and repeated small draws tend to raise the temperature higher on each draw with the result that steam is sometimes formed.

In conventional water heaters of the storage type, whether automatic or non-automatic, it is customary during operation to burn the maximum amount of gas. As the heater continues to burn over a period of time, and the water in the tank becomes heated, there is a continuous rise in the temperature of the water within the heating unit, until such time as the gas is extinguished. Thus the temperature of the water in the heating unit may become very high while the temperature in the lower portion of the storage tank is cool or only moderately warm. Such a high temperature results in the deposit of lime in the heating section regardless of the kind of material of which the section is composed. The critical point at which lime deposits varies with different kinds of water, and I have found that such depositions from most of the hard water met with in practice may be eliminated by maintaining the temperature of the water in the heating unit below the critical point of lime deposit for the water heated.

It is among the objects of the present invention to avoid the above mentioned defects and to provide a temperature control which will prevent lime deposits within the heating unit and which will provide for the full use of the storage capacity of the tank by maintaining the heater in operation until the tank has been completely filled with hot water of a desirable temperature.

It is a further object of the invention to provide a control which while permitting the full use of the storage capacity of the tank will nevertheless permit a considerable rise in the temperature of the water at the top of the tank at the beginning of the heating cycle so that water at a desirable temperature will be available immediately after starting the heater.

The above and other objects and features of the invention will be apparent to those skilled in the art from a consideration of the following detailed description taken in conjunction with the accompanying drawings, in which:

Fig. 1 shows in side elevation, with parts broken away to show the internal structure, a heating unit provided with a temperature control constructed in accordance with the invention; and Fig. 2 shows a modified form of the invention.

Referring to Fig. 1, reference numeral 1 indicates a heater consisting of a heating element 2 positioned above a suitable main gas burner 3. Cold water is supplied to the heating element 2 from a pipe leading from the lower portion of a tank 4 by way of T-fitting 5 and vertically extending pipe 6. A discharge connection 7 is provided at the upper end of the heating element for conducting the hot water therefrom back to the storage tank. A thermostat 8 inserted through one of the openings of the fitting 5 projects upwardly into the pipe 6 and is adapted to control a gas valve 9 which is positioned in a housing 10 supported by a plug 11 which is screw threaded into the lower opening of the T-fitting 5. The rod 12 of the thermostat 8 projects through an opening 13 in the housing 10 to act upon an arm 14 of a suitable snap-acting mechanism 15. Gas is supplied to the housing 10 by way of a safety pilot control device 16 to a chamber 17 below a partition 18 which is provided with an opening 19 adapted to be controlled by the valve 9. From the opening 19 gas passes to a chamber 20 containing the snap-acting mechanism 15 and thence through outlet 21 which leads by way of pipe 22 to the mixing tube of the burner 3. A second thermostat 23 which in the instance shown is of the expanding fluid type is located in the upper portion of the heating element 2 and connected by means of a capillary tube 24 with a chamber 25 formed by a cup 26 which is fastened by screw bolts 27 to a plug 28. The plug 28 is provided with a screw threaded portion 29 adapted to be screwed into an opening in the lower end of the casing 10, and provides a support and guide for the valve 9. Within the chamber 25 is a metallic bellows 30 which is supported by an annulus 31 inserted in the upper portion of the cup 26. This annulus also provides a seal to prevent the escape of fluid enclosed in the chamber 25. A rod 32 adjustably supported in a plug 33 within the bellows 30 abuts a pin 34 projecting through a central opening in the plug 28 to contact a stem 35 of the valve 9. The rod 32 is biased in the outward or opening direction by a spring 36 which surrounds the plug 33 and tends to maintain the bellows 30 in an expanded position against the pressure of the fluid in the chamber 25. A spring 37 bears at one end against the plug 28 and tends to bias the valve 9 in a closing direction.

In the operation of this form of the device, it will be understood that when starting from cold with the burner 3 ignited, neither the thermostat 8 nor the thermostat 23 is effective for materially limiting the flow of gas to the burner. However, the graduating thermostat 23 does prevent an undue rise of temperature within the heating element 2 during the few moments required for the inertia of the column of liquid in the connections between the heating element and tank to be overcome by the force of convection to thereby initiate circulation. This requires but a brief interval so that the quantity of gas supplied to the heater is at a maximum rate and a quantity of hot water in the upper portion of the tank is therefore available for immediate use. As the heating element 2 and the contents thereof become hotter and approach the desired limit of temperature, which preferably does not exceed 165 degrees, the fluid in the thermostat 23 tends to expand and this expansion transmitted through the bellows 30, rod 32, pin 34 and stem 35 acts to move the valve 9 in a closing direction. The action of these parts is gradual and tends to gradually reduce the quantity of gas flowing to the burner 3 rather than to sharply cut off the gas. The heat supplied to the unit 2 is therefore reduced and the temperature of the water therein is maintained at a point below the desired maximum limit. The tank is thus gradually and completely filled with water which can not exceed the predetermined maximum temperature. As the temperature at the bottom of the tank slowly rises due to continued circulation, the thermostat 8, which is positioned in the lowermost portion of the tank or in the connections leading from this portion, acts at a temperature which is preferably about 135 degrees to quickly and completely close the valve 9 by removing the tension exerted thereagainst by the snap action mechanism 15. The thermostat 8 does not again function to open the valve 9 and supply gas to the burner until there is a substantial reduction of the temperature of the water in the lower portion of the tank and in the connections leading to the heater. Thus the burner 3 is not intermittently cut in and cut out of operation during the final heating period.

The form shown in Fig. 2 is similar to the form shown in Fig. 1 except that two separate gas valves are provided. In this form a separate gas valve 39 is provided in a housing 40 and is acted upon by the thermostat 41 in precisely the same manner in which the thermostat 23 acts upon the valve 9 in the form shown in Fig. 1. In other words, this thermostat functions as a graduating thermostat to regulate the flow of fuel to the burner and to maintain the temperature in the heating unit below the desired limit of temperature without completely cutting off the flow of gas to the burner. A second thermostat 42 similar in all respects to the thermostat 8 acts upon a second valve 43 which is in series with the valve 39 to completely and abruptly cut off the flow of gas to the main burner as soon as the tank is completely filled with hot water. The remaining structure and operation of this form will now be apparent from the above description of the form of Fig. 1.

It will be understood that in accordance with conventional practice, a pilot valve indicated at 44 is provided adjacent the main burner 3 and is continuously supplied with gas by way of the tube 45.

It will be understood that in both embodiments illustrated, the graduating thermostat is ineffective to reduce the gas supply below that required to maintain a flame at the burner. To reduce the gas supply below this predetermined minimum would cause the flame to be extinguished although a small quantity of gas is still being supplied. The gas supply is therefore cut off completely only by the snap-acting thermostat.

It will be obvious to those skilled in the art that the snap-acting thermostat may be placed in the lower portion of the tank or in the lower connections between the tank and the heater as convenient. Similarly the graduated thermostat may project into the top of the heating element as shown, or if desired into the upper connections between the tank and the heater, or into the upper portion of the tank; in general at any point in the system where the temperature of the liquid approximates that within the upper or hottest portion of the heating element. Such repositioning of the graduated thermostat would retain most of the advantages of the embodiments illustrated and the broader of the following claims are intended to cover such constructions. The arrangement of the graduating thermostat in the heating element is preferred inasmuch as this arrangement prevents the undue rise of the temperature in the heating element during the brief interval between the lighting of gas burner and the initiation of the water circulation.

Having thus described the invention, what is claimed as new is:

1. A liquid heater comprising a heating unit, a burner therefor, a system through which liquid circulates by convection including a storage tank and connections for the supply of liquid from the lower portion of said tank to said unit and for the discharge of heated liquid from said unit to the upper portion of said tank, a graduating thermostat subject to the temperature of the liquid at approximately the hottest temperature of the system acting to reduce the supply of gas to the burner as the temperature increases without reducing said supply below that required to maintain a flame at the burner, and a snap action thermostat subject to the temperature of the liquid at approximately the lowest temperature of the system to abruptly cut off the flow of gas to the burner at a predetermined temperature.

2. A liquid heater comprising a heating unit, a burner therefor, a system through which liquid circulates by convection including a storage tank and connections for the supply of liquid from the lower portion of said tank to said unit and for the discharge of heated liquid from said unit to the upper portion of said tank, a gas valve controlling the supply of gas to the burner, a graduating thermostat subject to the temperature of the liquid at approximately the hottest temperature of the system acting upon one side of said valve and effective upon increasing temperature to reduce the supply of gas to the burner from that of the maximum capacity of the burner to but not below that required to maintain a flame at the burner, and a snap action thermostat subject to the temperature of the liquid at approximately the lowest temperature of the system acting upon the opposite side of said valve to abruptly close the same when said lowest temperature attains a predetermined value.

3. A liquid heater comprising a heating unit, a burner therefor, a system through which liquid circulates by convection including a storage tank and connections for the supply of liquid from the lower portion of said tank to said unit and for the discharge of heated liquid from said unit to the upper portion of said tank, a pair of gas valves connected in series for controlling the supply of gas to the burner, a graduating thermostat subject to the temperature of the liquid at approximately the hottest temperature of the system acting upon one of said gas valves to gradually close the same as the temperature increases but incapable of reducing said supply below that required to maintain a flame at the burner, and a snap action thermostat subject to the temperature of the liquid at approximately the lowest temperature of the system acting upon the other valve to abruptly cut off the flow of gas to the burner at a predetermined temperature thereof.

4. A liquid heater comprising a heating unit, a burner therefor, a system through which liquid circulates by convection including a storage tank and connections for the supply of liquid from the lower portion of said tank to said unit and for the discharge of heated liquid from said unit to the upper portion of said tank, a graduating thermostat subject to the temperature of the hot water in the upper portion of the heating unit acting to graduate the supply of gas to the burner but incapable of reducing said supply below that required to maintain a flame at the burner, and a snap action thermostat subject to the temperature of the liquid flowing to the heater from said tank to abruptly cut off the flow of gas to the burner.

5. A liquid heater comprising a heating unit, a burner therefor, a system through which liquid circulates by convection including a storage tank and connections for the supply of liquid from the lower portion of said tank to said unit and for the discharge of heated liquid from said unit to the upper portion of said tank, a gas valve controlling the supply of gas to the burner, a graduating thermostat subject to the temperature of the water in the upper portion of the heating unit acting upon one side of said valve and capable of varying the supply of gas to the burner from the maximum capacity of the burner to but not below that required to maintain a flame at the burner, and a snap action thermostat subject to the temperature of the liquid flowing to the heater from said tank acting upon the opposite side of said valve.

6. A liquid heater comprising a heating unit, a burner therefor, a system through which liquid circulates by convection including a storage tank and connections for the supply of liquid from the lower portion of said tank to said unit and for the discharge of heated liquid from said unit to the upper portion of said tank, a pair of gas valves connected in series for controlling the supply of gas to the burner, a graduating thermostat subject to the temperature of the hot water in the upper portion of the heating unit acting upon one of said gas valves to gradually reduce the supply of gas to the burner to but not below that required to maintain a flame at the burner as the temperature in the upper portion of the heating unit increases, and a snap action thermostat subject to the temperature of the liquid flowing to the heater acting upon the other valve to abruptly cut off the flow of gas to the burner at a predetermined temperature of the incoming liquid.

HERBERT J. LONG.